(12) United States Patent
Mitsuda

(10) Patent No.: US 7,366,064 B2
(45) Date of Patent: Apr. 29, 2008

(54) DISK REPRODUCING APPARATUS

(75) Inventor: Hiroshi Mitsuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 527 days.

(21) Appl. No.: 10/846,696

(22) Filed: May 17, 2004

(65) Prior Publication Data
US 2004/0240348 A1    Dec. 2, 2004

(30) Foreign Application Priority Data
May 19, 2003    (JP)    ............ P 2003-140038

(51) Int. Cl.
*G11B 7/00*    (2006.01)
(52) U.S. Cl. ............... 369/44.29; 369/47.28
(58) Field of Classification Search ............ 369/44.29, 369/47.25, 47.28
See application file for complete search history.

(56) References Cited

U.S. PATENT DOCUMENTS 4,748,608 A * 5/1988 Matsumoto et al. .......... 369/43
5,036,508 A * 7/1991 Okano ..................... 369/47.48
6,438,080 B1 * 8/2002 Shoji et al. .............. 369/47.28
6,947,365 B2 * 9/2005 Lai et al. .................. 369/59.2

FOREIGN PATENT DOCUMENTS

JP    07-093907    *    7/1995
JP    8-329604         12/1996

* cited by examiner

*Primary Examiner*—Thang V. Tran
*Assistant Examiner*—Van T. Pham
(74) *Attorney, Agent, or Firm*—Morgan, Lewis & Bockius LLP

(57) ABSTRACT

A disk reproducing apparatus for reproducing a digital audio signal recorded on a DVD or CD has a PLL portion for outputting a synchronizing signal in synchronism with the digital audio signal. When the CD is reproduced at double speed or higher, the PLL portion increases again while seeking tracks, and restores the gain if a predetermined time has passed after the end of seek.

3 Claims, 3 Drawing Sheets

DISK REPRODUCING APPARATUS

BACKGROUND OF THE INVENTION

1. Field of the Invention

The present invention relates to a disk reproducing apparatus for reproducing a disk such as a DVD or CD, and more particularly to a disk reproducing apparatus having a PLL for generating a synchronizing signal for a digital audio signal recorded on the disk.

2. Description of the Related Art

A conventional disk reproducing apparatus is disclosed in JP-A-8-329604 (pages 2 to 4, FIG. 3). This disk reproducing apparatus comprises a PLL (Phase Locked Loop) for outputting a synchronizing signal that is synchronous with a digital audio signal. The PLL has a phase detector, a VCO (voltage-controlled oscillator) and an LPF, and can oscillate correctly by controlling the VCO or the circuit loop.

Also, a counter is built in to output the signal at a frequency that is an integral multiple of input signal. Thereby, the CD is reproduced, for example, at double speed faster than the normal rotating speed, shortening the signal processing time. Also, the disk reproducing apparatus has a seek function of detecting a desired track by jumping the tracks formed on the concentric circles of the disk.

SUMMARY OF THE INVENTION

However, in the conventional disk reproducing apparatus, if the disk is reproduced at multiple speed, the detection precision of track is degraded, because the revolutions of the disk is large and the frequency of synchronizing signal is high. It takes a longer time to detect the track position at the end of seek, and an error of not detecting desired track within a preset time may occur.

It is an object of this invention to provide a disk reproducing apparatus in which an error at the time of seek is prevented.

In order to accomplish the above object, this invention provides a disk reproducing apparatus for reproducing a digital audio signal recorded on a DVD or CD, comprising: a PLL for outputting a synchronizing signal in synchronism with the digital audio signal; wherein when the CD is reproduced at double speed or higher, the PLL increases a gain while seeking tracks, and restores the gain if a predetermined time has passed after the end of seek.

With this constitution, the disk of the CD is synchronized with the synchronizing signal output from the PLL to reproduce the digital audio signal at double speed or higher. If the seek is started by stopping the tracking for the tracks formed on the concentric circles of the disk, the gain of the PLL is increased. If the seek into a predetermined position is ended, the tracking is started, so that a desired track is detected. And the gain of the PLL is restored if the time of 100 msec, for example, has passed after the end of seek.

Also, this invention provides a disk reproducing apparatus for reproducing a digital audio signal recorded on a disk, comprising: a PLL for outputting a synchronizing signal in synchronism with the digital audio signal; wherein the PLL increases a gain while seeking tracks, and restores the gain if a predetermined time has passed after the end of seek Further, the disk reproducing apparatus of the invention is characterized in that when a CD as the disk is reproduced at double speed or higher, the PLL increases the gain while seeking tracks, and restores the gain if a predetermined time has passed after the end of seek.

DETAILED DESCRIPTION OF THE PREFERRED EMBODIMENTS

Figure 1:
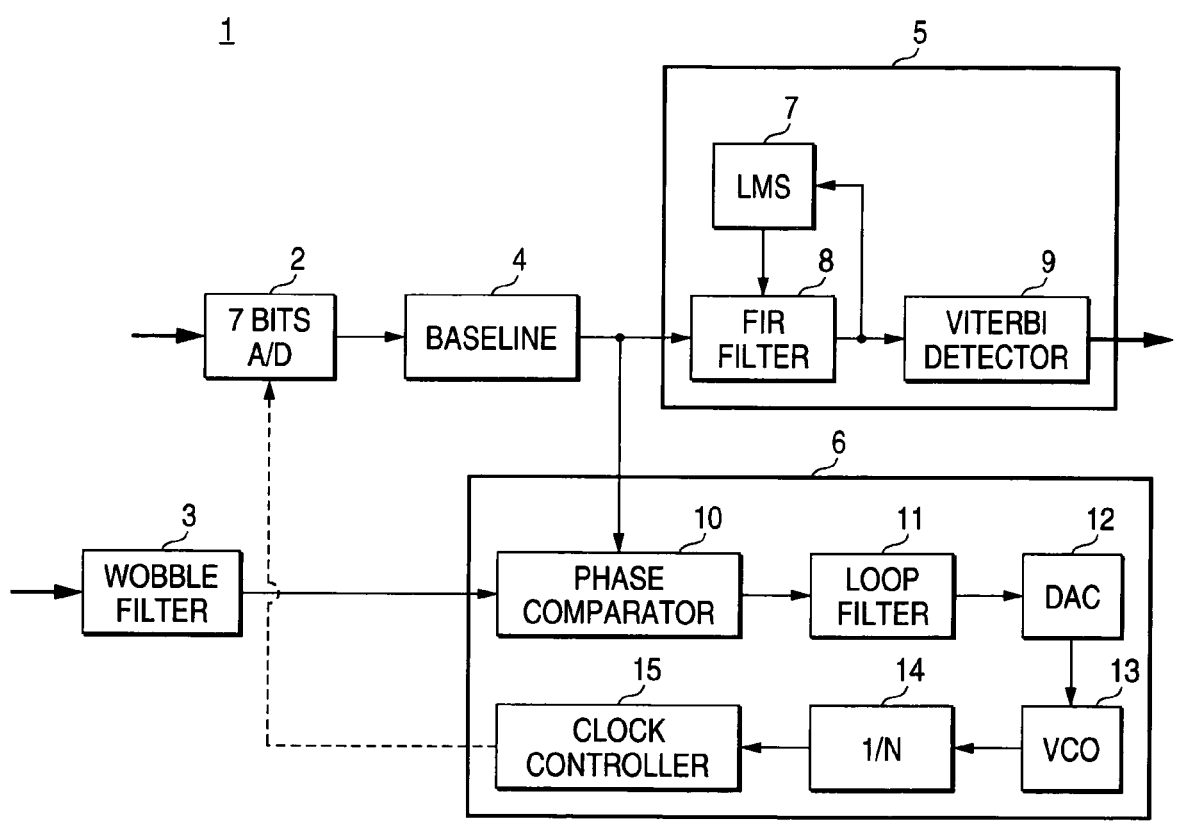
FIG. 1 is a block diagram showing a signal processing circuit of a disk reproducing apparatus according to an embodiment of the present invention.

The preferred embodiments of the present invention will be described below with reference to the accompanying drawings. FIG. 1 is a block diagram showing a signal processing circuit of a disk reproducing apparatus according to one embodiment of the present invention. The disk reproducing apparatus has an optical pickup (not shown), in which light is applied from a light source provided in the optical pickup onto a disk of DVD or CD.

The disk is formed with tracks on concentric circles, whereby a signal recorded on the tracks is taken out by a reflecting light from the disk. The reflecting light from the disk is captured by a light receiving element provided for the optical pickup, and photoelectrically converted into an analog signal. The analog signal output from the light receiving element includes a wobble signal and an audio signal.

The wobble signal and the audio signal are input into a signal processing circuit 1. The signal processing circuit 1 has an A/D converter 2, a wobble filter 3, a baseline 4, a PRML portion 5 and a PLL portion 6.

The A/D converter 2 converts an analog signal into a digital signal. The wobble filter 3 removes the noise component from the wobble signal. The PRML portion 5 includes an LMS 7, an FIR filter 8 and a Viterbi detector 9 to make the error correction for a digital audio signal input via the baseline 4. Thereby, the digital audio signal is output from the PRML portion 5.

The PLL portion 6 includes a phase comparator 10, a loop filter 11, a D/A converter 12, a VCO 13, a 1/N frequency divider 14, and a clock controller 15. The phase comparator 10 compares the phase of wobble signal with that of digital audio signal to output the comparison result. The loop filter 11 removes the noise component from the signal of comparison result input from the phase comparator 10.

The D/A converter 12 makes the D/A conversion for an output signal of the loop filter 11. The VCO 13 controls the voltage from a power source (not shown), based on the comparison result of the phase comparator 10 and outputs a synchronizing signal to the 1/N frequency divider 14. The 1/N frequency divider 14 divides the frequency of the input synchronizing signal by 1/360 and output a divided signal. The clock controller 15 supplies the synchronizing signal output from the 1/N frequency divider 14 to the A/D converter 2. Thereby, the rotation of the disk is synchronized with the digital audio signal read from the disk.

Also, in reproduction, the CD is reproduced at double speed or 2.2 speed, for example, which is faster than the normal rotating speed to shorten the signal processing time, allowing for other complex signal processing.

Figure 2:
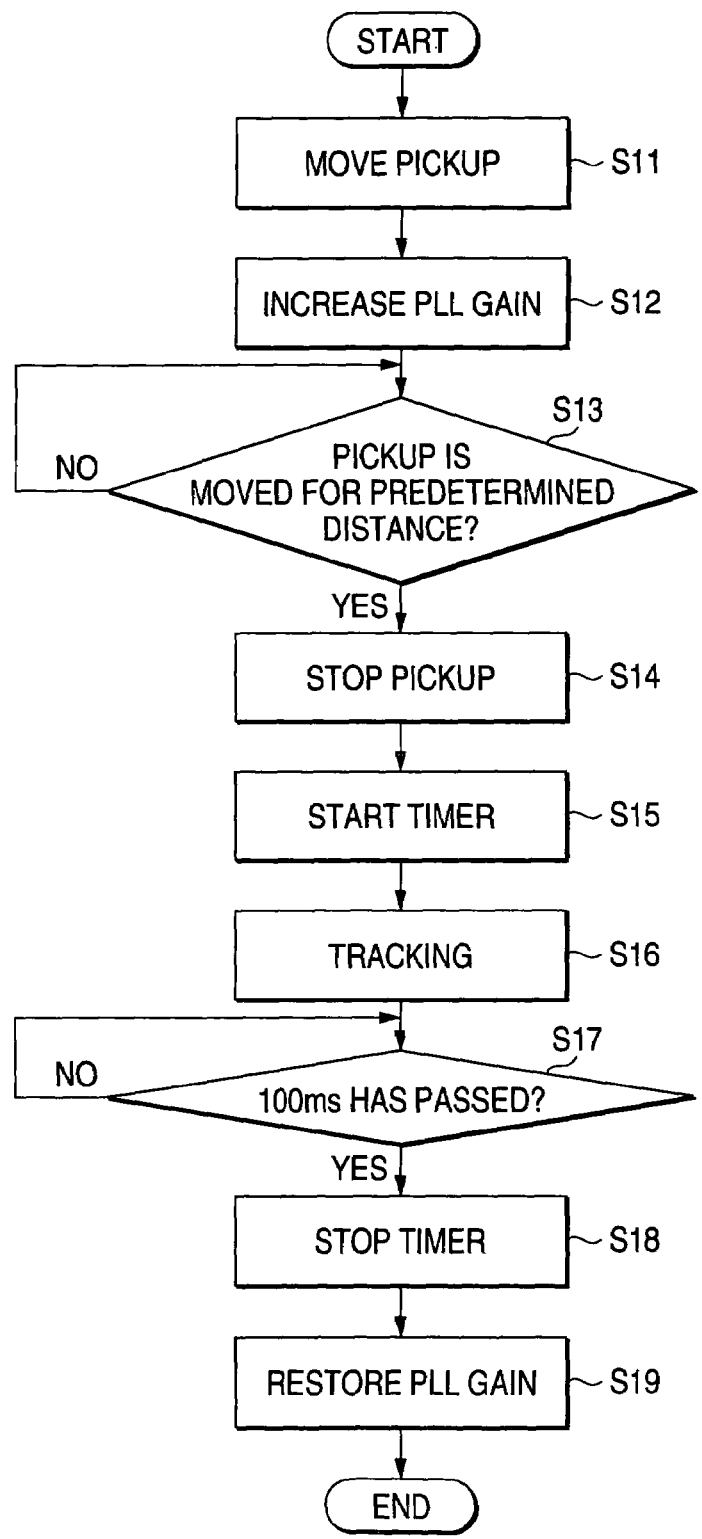
FIG. 2 is a flowchart showing the operation of a seek processing in the disk reproducing apparatus according to the embodiment of the invention.

In the disk reproducing apparatus with the above constitution, if a seek for jumping plural tracks is instructed when the CD is reproduced at multiple speed, a seek processing is performed as shown in FIG. 2. If the seek is started, the tracking is stopped, and a drive signal is input into a moving motor for the optical pickup at step S11, as shown in (a) of FIG. 3. Thereby, the movement of the optical pickup is started (T0 in FIG. 3).

Figure 3:
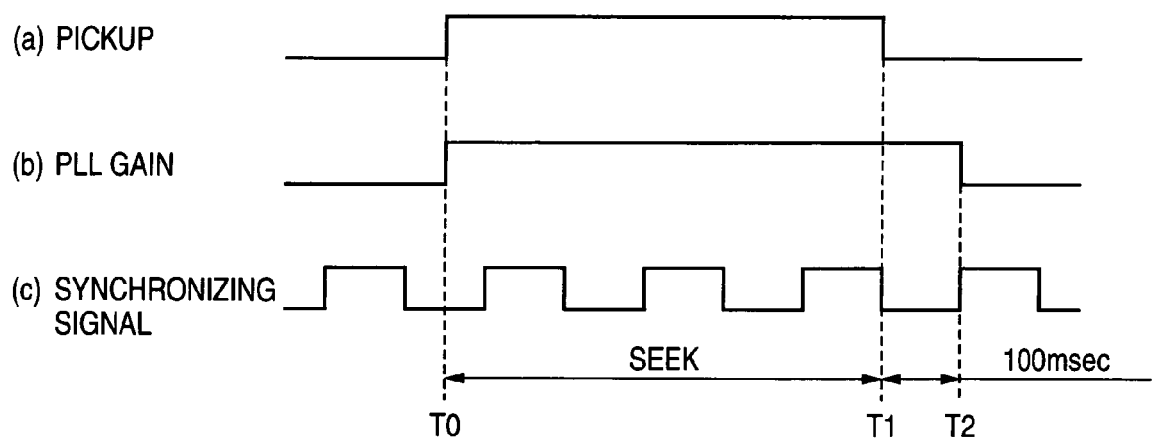
FIG. 3 is a time chart showing the operation of the seek processing in the disk reproducing apparatus according to the embodiment of the invention.

At step S12, the gain of the PLL portion 6 is increased, as shown in (b) of FIG. 3. Thereby, the input signal into the D/A converter 12 is amplified, and the synchronizing signal output from the PLL portion 6 has a sharp transition, as shown in (c) of FIG. 3. At step S13, the optical pickup is continued, and moved for a specified seek distance. Then, at step S14, the movement of the optical pickup is stopped (T1 in FIG. 3).

At step S15, a timer is started. Then, at step S16, the tracking and focusing for the CD is performed. Thereby, the reproduction of the CD is ready. At step S17, the operation waits until the time of 100 msec has passed from the start of the timer. If the time of 100 msec has passed, the timer is stopped at step S18, and at step S19, the gain of the PLL portion 6 is restored (T2 in FIG. 3).

With this embodiment, the gain of the PLL portion 6 is kept high for a predetermined time after the end of seek, whereby the synchronizing signal after the end of seek has a sharp transition, preventing a tracking error from occurring. Also, a flaw on the disk is easily captured in a state where the gain of the PLL portion 6 is high. However, because the gain of the PLL portion 6 is restored in a predetermined time after the end of seek, the increased error rate is suppressed due to detection of flaw of the disk. Preferably, the gain of the PLL during the time between T0 to T2 in FIG. 3 is 2.5 times to 3.0 times higher than that of the other time.

Though the gain of the PLL portion 6 is increased at the start time of seek, the gain of the PLL portion 6 may be increased immediately before the end of seek by detecting the time or the movement distance of the optical pickup. Also, the gain of the PLL portion 6 may be increased in seeking the DVD that is being rotated at high speed.

The time between T1 to T2 in FIG. 3 is not limited to 100 msec, but may be 50 ms to 200 msec.

With this invention, since the gain of the PLL is kept high for a predetermined period after the end of seek, the rise of synchronizing signal after the end of seek is so sharp that the tracking error is prevented. Also, since the gain of the PLL is restored if the predetermined time has passed after the end of seek, the increased error rate due to detection of flaw on the disk is suppressed.

What is claimed is:

1. A disk reproducing apparatus for reproducing a digital audio signal recorded on a disk medium, comprising:
   an optical pickup operable to obtain the digital audio signal;
   a PLL operable to output a synchronizing signal in synchronism with the digital audio signal; and
   a timer which starts counting a predetermined time period when the optical pickup is stopped after being moved for a specified seek distance,
   wherein the PLL increases a gain thereof at least while the optical pickup is moved for the specific seek distance, and restores the gain when the timer finishes counting the predetermined time period.

2. The disk reproducing apparatus according to claim 1, wherein the PLL increases the gain in a case where the disk medium is reproduced at a double speed or higher.

3. The disk reproducing apparatus according to claim 1, wherein the predetermined time period is more than 50 msec and less than 200 msec.

* * * * *